G. H. UNDERHILL.
PHONOGRAPH.
APPLICATION FILED NOV. 14, 1910.
1,227,023.
Patented May 22, 1917.
3 SHEETS—SHEET 3.
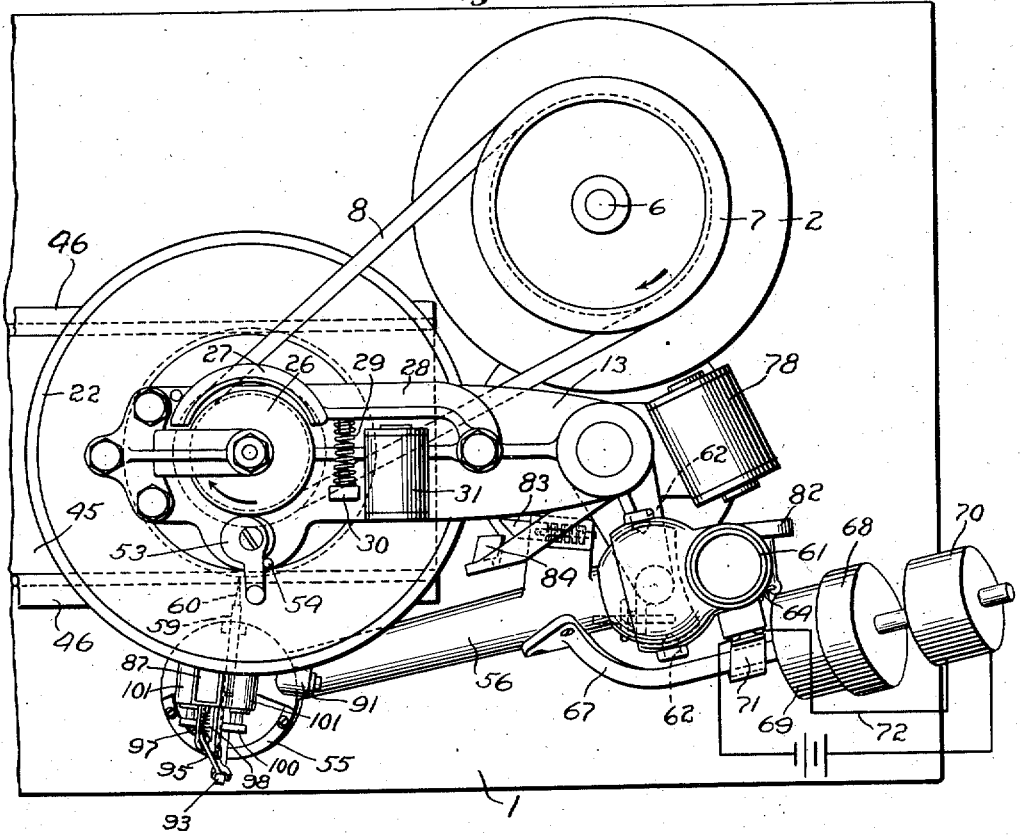
Fig. 10.
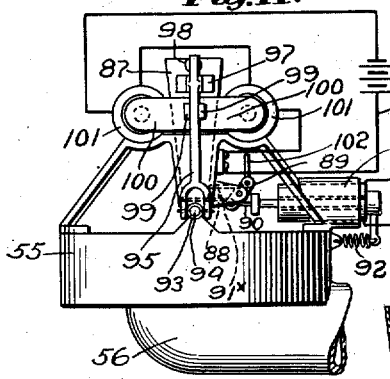
Fig. 11.
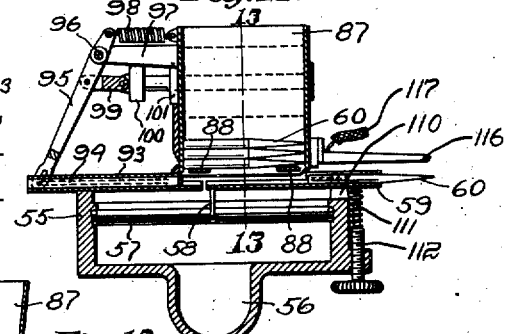
Fig. 12.
Fig. 13.
Witnesses:
Ernest A. Telfer
Robert H. Kammler
Inventor:
George H. Underhill,
by Mary Booth Janney Harvey
Atty.

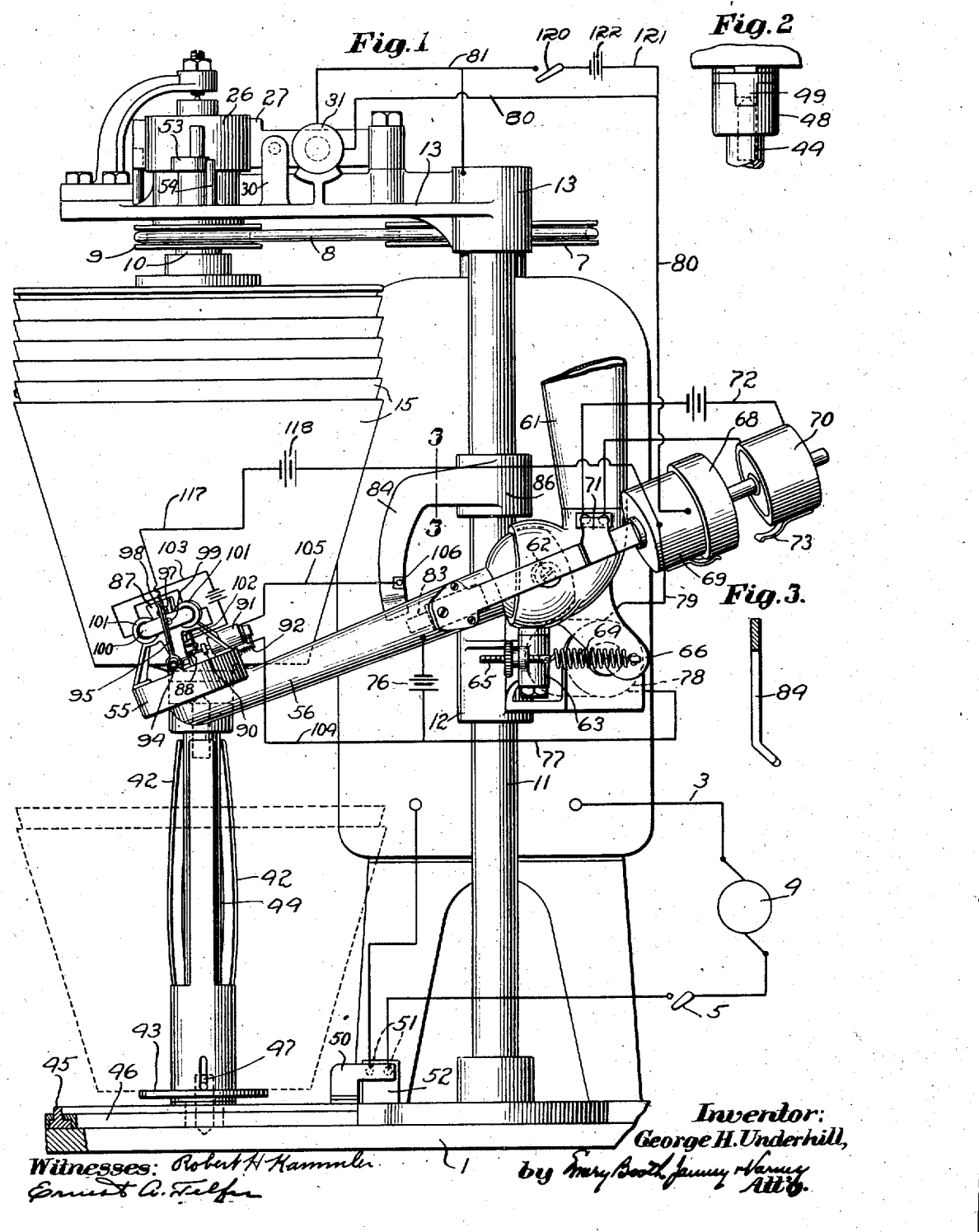

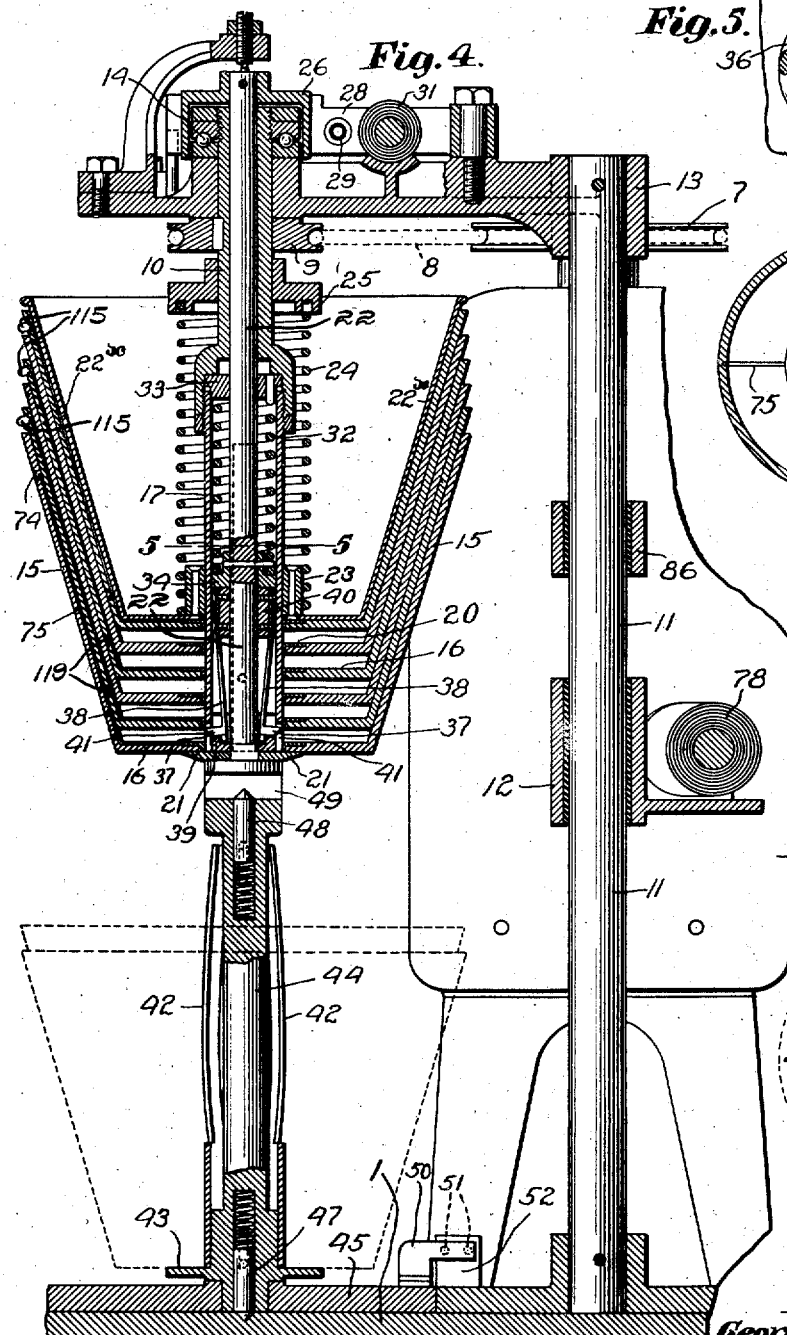

UNITED STATES PATENT OFFICE.

GEORGE H. UNDERHILL, OF BOSTON, MASSACHUSETTS.

PHONOGRAPH.

1,227,023.   Specification of Letters Patent.   Patented May 22, 1917.

Application filed November 14, 1910. Serial No. 592,179.

*To all whom it may concern:*

Be it known that I, GEORGE H. UNDERHILL, a citizen of the United States, and a resident of Boston, county of Suffolk, State of Massachusetts, (whose post-office address is 86 Gainsboro street, Boston, Massachusetts,) have invented an Improvement in Phonographs, of which the following description, in connection with the accompanying drawings, is a specification, like letters on the drawings representing like parts.

This invention relates to phonographs and more particularly though not exclusively to multiple record phonographs or those employed for playing a plurality of records.

The invention will be best understood by reference to the following description when taken in connection with the accompanying illustration of one specific embodiment thereof, while its scope will be more particularly pointed out in the appended claims.

In the drawings:

Figure 1 is a side elevation of a sound reproducing machine embodying one form of my invention;

Fig. 2 is a detail of the clutch connection between the upper and lower parts of the rotatable record support;

Fig. 3 is a sectional elevation on the line 3—3 in Fig. 1 showing the reproducer guiding cam;

Fig. 4 is a sectional elevation of the machine shown in Fig. 1 on a plane taken through the rotatable record support;

Fig. 5 is a section in plan on the line 5—5 in Fig. 4;

Fig. 6 is a section in plan taken through one of the record shells;

Fig. 7 is an elevation of the lower end of the releasing key in partial section;

Fig. 8 is a section in plan on the line 8—8 in Fig. 7;

Fig. 9 is a section in plan taken through the record driving-sleeve and releasing shaft, a record being shown in relation thereto in dotted lines;

Fig. 10 is a plan view of the machine shown in Fig. 1;

Fig. 11 is a side elevation of the reproducing mechanism showing the needle changing devices;

Fig. 12 is a section through the reproducing mechanism taken at right angles to the plane of Fig. 11; and Fig. 13 is a section through the needle hopper taken on the line 13—13 in Fig. 12.

Referring to the drawings and to the embodiment of the invention therein specifically disclosed, I have there shown a multiple record phonograph adapted to reproduce in succession a plurality of records. While the record herein disclosed possesses certain advantages over records of the disk or cylinder type, the invention as to many of its novel features is applicable to disk or cylinder records or both, and the term phonograph is employed in its generic sense to apply to all forms of sound reproducing or sound recording machines.

Referring to the drawings, there is shown mounted upon a base 1 a driving motor 2, which may be of any suitable form or construction, but herein is an electric motor connected through the supply circuit 3 (see the diagram in Fig. 1) to a suitable source of electro-motive force 4 and controlled by the starting switch 5.

The motor shaft 6 carries near its upper end (Figs. 1 and 10) a grooved pulley 7 connected through the belt 8 with a second grooved pulley 9, the latter keyed (Fig. 4) to the upper section 10 of the record driving sleeve to be more fully referred to.

At the side of the motor on the base 1 there is also provided the upright supporting rod 11 to which is attached the bracket 12 carrying the sound reproducing devices and near its upper end also the bracket 13 which overhangs the record support and carries ball bearings 14 for the upper end of the record driving sleeve 10. The bracket 13 also sustains devices to be hereinafter described, which are provided for controlling the successive presentation of the records to the sound reproducing mechanism.

Referring now more particularly to the records and the record support, the former consist each of a shell having tapered sides 15 and provided with a perforated head 16 at the lower or smaller end, so that the record has the shape of a truncated cone with a sound groove surface lying oblique to the axis of the record. This form of record is of great advantage in a multiple record phonograph since it permits the records to be stacked one above the other in nested relation so that they can be stored compactly into a very small compass while each individual record presents a sound recording surface of unusually large effective area.

The nested records, as shown in Fig. 4, are carried upon the lower record driving sleeve section 17, the latter having a fixed threaded attachment to the upper sleeve section 10 and being provided (see Figs. 5 and 9 and dotted lines Fig. 4) with a spline or key 18 which fits one of two diametrically opposite notches 19 formed in the perforated plate 20 with which each record head 16 is provided. When the records are in the position shown in Fig. 4, the grooves 19 register with and receive the spline 18 so that they are kept in alinement and all turned as a unit with the driving sleeve.

The lowermost record rests against a pair of diametrically opposite retaining fingers or lugs 21 carried by the lower end of the releasing shaft 22 which passes coaxially through the driving sleeve 17, the said lugs being normally disposed at right angles to the series of notches 19 in the records. The uppermost record is engaged and constantly pressed down by means of the follower 22×, the latter comprising a conical shell adapted to fit within a record and secured to the sliding collar 23 on the sleeve 17. The follower is constantly pressed downward by means of the coiled spring 24, the upper end of which abuts against the plate 25 carried by the driving sleeve 10.

After the reproducing mechanism has been traversed across the face of the lower or exposed record, the reproducer arm is swung to one side and the lowermost record shifted, this being accomplished herein by dropping the same to the dotted line position shown in Fig. 4 to present the next successive record to the reproducing devices. The lowermost record is released by causing the retaining lugs 21 to make a quarter turn relatively to the record so as to bring them into registration with the grooves 19, whereupon the record is free to pass over the lugs and is caused to drop by gravity into the dotted line position shown.

To impart a releasing movement to the lugs, the releasing shaft 22 has secured to its upper end a brake wheel 26 adapted to be momentarily engaged by the brake shoe 27, which latter is carried by the pivoted arm 28. The shoe is normally prevented from contacting with the brake wheel by means of the spring 29 (Fig. 10) interposed between the lever 28 and fixed abutment 30, but may be drawn thereagainst, temporarily to retard the movement of the releasing shaft 22, by means of the electro-magnet 31 operatively disposed with reference to the lever 28.

To cause the releasing key normally to turn with the record driving sleeve and in fixed relation thereto, there is employed a coiled spring 32 located within the sleeve 17, one end of which spring is fastened to a collar 33 secured to such sleeve and the opposite end to the collar 34 fixed to the releasing shaft 22. This spring tends constantly to turn the releasing shaft and releasing key relatively to the sleeve 17 so that one end of a slot 35 formed in the collar 34 (see Fig. 5) is drawn against an upright pin 36, the latter fixed on a part rotating with the sleeve 17 and serving as a stop normally to position the lugs 21 at right angles to the spline 18.

If, however, the magnet 31 is energized the brake shoe is applied to the brake wheel 26 and rotation of the releasing key momentarily checked. The rotation of the sleeve continuing, this causes the spring to yield and the pin 36 to abut against the opposite end of the slot 35, bringing the lugs 21 in line with the spline 18 and the notches 19 and releasing the lowermost record which immediately drops. The brake shoe is applied for an instant only, so that as soon as the record slips over the lugs the latter are immediately thrown back to their initial position at right angles to the spline where they serve to catch and sustain the next succeeding record until that in turn has been played, the remaining records of the series moving up thereagainst under the action of the spring-pressed follower.

In order to hold back the second record of the series while releasing the first, a pair of catches 37 are provided which are carried by spring arms 38. The latter are given such resiliency as tends to press them radially outward, but they are normally drawn inward as shown in Fig. 4 by engagement between the lower ends of the catches and the raised portions of the cam member 39 carried by the releasing shaft which bears the releasing fingers 21. The spring arms 38 are secured to a collar 40 which turns with the record rotating sleeve 17. When the movement of the releasing shaft is checked as described, the cam shaped member 39, in turning with the releasing shaft to release the lowermost record, releases the catches 37 which then move outwardly through perforations 41 in the sleeve 17, under the second record of the series and prevent the latter from moving down against the fingers 21. When the brake 27 is withdrawn from the brake wheel 26, however, the spring 32 throws the fingers 21 back a quarter of a turn and the cam member 39 in turning with the fingers draws the catches 37 into the perforations 41 of the sleeve.

The records when dropped are caused to pass over spring fingers 42 or other means serving to cushion their descent, being supported, when they have descended into the lowermost position, on the plate 43 carried by the upright supporting member 44. While the latter, if desired, may be fixed and non-rotatable, herein it forms a part of the same rotary record support with the record rotating sleeve 17 so that the records which have been reproduced, as well as those which have not been reproduced, are all rotated together. This maintains the mass of the rotating parts at all times substantially constant irrespective of the progressive presentation of successive records to the reproducing mechanism, and, therefore, keeps a substantially constant load upon the motor.

In order that the entire lot of records when deposited in their ineffective position may be withdrawn for the purpose of substitution or for other reasons, the supporting member 44 is mounted upon the sliding plate 45 which can be slid into or out of position upon the base 1, being guided accurately into its required position by means of the guiding members 46. A spring-pressed pin 47 carried in the lower end of the support 44 positions the slide in the required location upon the base, but yields to permit the withdrawal of the slide when removal of the latter is desired. The upper end of the support is provided with a similar pin 48 which engages with a depression in the slip joint connection 49, (Figs. 2 and 4) which latter is secured to the lower end of the releasing shaft 22 and serves to turn the support 44 with the releasing shaft, but permits the ready separation of the two when the slide 45 is withdrawn.

In order that the motor may be rendered inoperative when the holder slide 45 is out of position, a cut-out switch is employed comprising a movable contact 50 carried by the slide 45 which contact, when the slide is in position, completes the motor circuit 3 by bridging a pair of contacts 51 carried by the lug 52 on the base 1. When the slide is withdrawn, however, the circuit is interrupted at the contacts 51.

In order manually to separate and shift the records from the playing position to the ineffective position, or vice versa, when the machine is not running, I have provided means for holding the record releasing shaft so that by first turning the record sleeve 10—17 backward and forward the records may be dropped one by one from the playing position to the removable support.

On the other hand by turning the sleeve 10—17 through ninety degrees the entire lot of records carried by the lower removable support may be lifted and slipped over the releasing fingers and on the sleeve the resilient catches 38 snapping back to permit each record to pass over.

For the purpose of holding the releasing shaft, I employ the cam member 53 pivoted upon the arm 13 and adapted to be turned so as to bear forcibly against the side of the brake wheel 26 and hold the same against turning. Normally the cam is turned back against the stop pin 54 in which position it leaves the brake wheel free for turning.

It is obvious that the number of records employed and the particular shape of the records utilized may be varied within wide limits, the machine, in fact, without substantial alteration as to the feeding and presenting devices, being applicable to records of disk form.

Referring now to the sound reproducing devices, the sound box 55 is carried at the end of a hollow reproducer arm 56, being provided with the diaphragm 57 which has suitable connection 58 to the stylus carrying sleeve 59 in which is maintained the stylus needle 60.

The stylus carrying sleeve is pivoted between lugs 110 and abuts against a spring 111 which serves to maintain a given tension upon the stylus and the diaphragm. An adjusting screw 112 is preferably provided which permits this tension to be adjusted at will.

The reproducer arm 56 has a ball and socket connection with the lower end of the sound tube 61, being pivoted at 62 on said sound tube so as to be capable of a vertical movement thereon. The sound tube in turn is pivoted at 63 upon the bracket 12 so as to turn about a vertical axis, this permitting the required movement of the reproducing device toward and from the face of the records. The sound tube in turn may be employed in connection with a usual horn of any suitable construction.

The sound tube and reproducer arm are normally swung inwardly about the pivot 63 so as to cause the stylus to engage with the record groove by means of the tension spring 64, one end of which is secured to the adjusting screw 65 fastened to the bracket 12, the opposite end to a lug 66 secured to the sound tube. The reproducer arm has secured thereto the rearward extension 67 which serves as a support for the sliding counterweight 68, the latter being drawn into either one of two positions by the respective electromagnets 69 and 70.

When the sound box is at its lowermost position the magnet 70 is caused to be energized by means of a bridging contact 71 which completes an energizing circuit 72 for the magnet, this resulting in attracting the counterweight 68 and causing it to move over against the magnet 70 where it is retained by the spring-holding clip 73. In this position of the counterweight the weight of the reproducer arm and sound box is slightly overbalanced so that the stylus is then free to travel up along the face of the record as it is permitted by the rotation of the record and its tracking in the record groove.

The machine, as so far described, may be employed to play a series of like records in succession, wherein the sound groove commences near the bottom of each record and terminates near the top thereof, or it may be employed to play a series of records wherein successive records alternate, the one having its sound groove commencing near the bottom and terminating near the top and the next successive record having its groove commencing near the top and terminating near the bottom. The latter form of record is particularly advantageous where it is desired to play continuous music or where continuity of reproduction for other reasons should not be interrupted. With the second form of record described, the stylus can pass from the end of the sound groove at the top of one record to the beginning of the sound groove near the top of the next adjacent record with no substantial intermission.

For the purpose of illustration both types of records are herein shown, the outer or lowermost record of the series shown in Fig. 4 being constructed to be played according to the first mode of operation referred to, and the remaining members of the series being constructed to be played according to the second mode of operation referred to.

Referring first to the playing of the type first referred to, the mode of operation is as follows:

The upward travel of the stylus continues until the record has been completely reproduced whereupon devices are set into operation which withdraw the stylus from the record and cause the arm to descend to its initial position at the same time applying the brake shoe 27 to release the lowermost record as heretofore described. Any suitable controlling mechanism may be utilized for this purpose but herein such control is effected electrically by means of electrical contacts in the surface presented by the record itself.

Referring to Fig. 6 and the lowermost record in Fig. 4, it will be seen that the face of each record is provided near its upper end with a contact piece 74 which is located at the end of the record groove. Such contact member is connected to the conductor 75 with the plate 20 and thereby grounded upon the frame of the machine. When the stylus reaches the end of the record groove it touches the contact 74 and a circuit is thereby completed through the frame of the machine, the stylus, the reproducer arm 56, the battery 76 (one terminal of which is connected to the reproducer arm) (see Fig. 1) the conductor 77, the magnet 78, the conductor 79, the counterweight magnet 69, the conductor 80, the magnet 31, the conductor 81, and thence again to the frame of the machine. The bracket 12 which supports the reproducer arm herein is insulated from its support 11 (see Fig. 4) and therefore from the machine frame.

When, therefore, the stylus reaches the end of the record groove, it touches the contact 74 and simultaneously energizes the brake magnet 31, the counterweight magnet 67 and the magnet 78. The energization of the brake magnet 31 drops the lowermost record as previously described, while the energization of the counterweight magnet 69 shifts the counterweight back to the position shown in Fig. 1 where it causes the descent of the reproducer arm and its restoration to its initial position. The magnet 78 which is carried upon the bracket 12 attracts an armature 82 (Fig. 10) carried by the lug 66 on the sound tube and swings the latter with the reproducer arm so as to withdraw the stylus away from the record and out of its path when the latter descends. The energization of these magnets is only momentary, but meanwhile a spring-pressed pin 83 which is carried by the reproducer arm (see Fig. 10) is caused to snap laterally past a depending cam 84. This pin bearing against the cam during the descent of the reproducer arm, prevents the latter from swinging the stylus back into contact with the next adjacent record until the arm has fully descended, whereupon the pin 83 drops over the lower end of the cam and allows the spring 64 to draw the stylus into contact with the record at the initial or starting point of the sound groove. When this point is reached the bridging contact 71 completes the energizing circuit 72 for the counterweight magnet 70, the counterweight is shifted and the reproducing mechanism is ready to reproduce the next record. The cam 84 which is carried by the insulated bracket 86 is of suitable shape to cause the reproducer arm to execute an inward movement simultaneously with its descent.

Preferably and herein I have provided means whereby simultaneously with the reproduction of a given record and the restoration of the reproducer to its initial position a fresh stylus or reproducing needle is substituted for the one previously used. Referring to Figs. 11, 12 and 13, on the sound box there is provided a hopper 87 adapted to carry a supply of reproducing needles 60. The lower end of the hopper is large enough to permit the needle to pass through the same into the semi-cylindrical end of the needle-receiving sleeve 59, but its exit is normally prevented by means of the pair of fingers 88 which constitute a gate. The fingers 88 are connected to the pivoted block 89, the latter in turn being jointed to the end of the plunger rod 90 of the solenoid magnet 91, the arrangement being such that when the magnet is energized the fingers 88 are withdrawn permitting the lowermost needle to descend into the needle carrier 59, the exit f the superposed needles being prevented by the simultaneous introduction of other ngers 91ˣ jointed to the upper end of the lock 89. A spring 92 secured to the depending lug on the opposite end of the plunger 90 maintains the gate 88 normally in a closed position.

To expel the old needle and introduce the new, there is provided in alinement with the sleeve 59 a second sleeve 93 in which is slidably movable the pin 94, the latter secured to the lever 95 by means of a pin passing through a slot in the sleeve 93. The lever 95 is fulcrumed at 96 upon a fixed lug 97, being normally secured in the position shown in Fig. 12 by use of the spring 98. It is also connected, however, by the link 99 to the armature 100 belonging to the pair of electro-magnets 101, so that, when the latter are energized, the lever is moved and the pin 94 thrown forward against the deposited needle. To move the pin at the appropriate time so that the new needle will be forced into the sleeve 59 and drive the old needle out, the magnets 101 are energized by means of a bridging contact 102 which latter is carried (Fig. 13) by the pivoted block 89 so arranged that when the gate 88 is opened the contact 102 closes the energizing circuit 103 for the electromagnets 101.

In order to energize the needle controlling magnet 91 at the appropriate time, the latter has its terminals connected (see Fig. 1), one through the conductor 104 to the battery 76 and the other through the wire 105 to a contact 106 located on the face of the cam 84 so that when the pin 83 (which is electrically connected to the reproducer arm) passes over the contact, the energizing circuit is completed and a fresh recording needle automatically substituted.

If it is desired to play two successive records without intermission by causing the stylus to pass from the end of the sound groove at the top of one record to the beginning of the sound groove at the top of the other and from the end of the sound groove near the bottom of the latter to the beginning of the sound groove near the bottom of the next adjacent record, the following means are provided for this mode of operation of the machine:

In such case the contact 74 is omitted from the first record and the sound groove extended to the very uppermost edge of the record. When the stylus reaches the end of the sound groove a contact is made so that the first or lowermost record is dropped and the stylus slipping over the edge of the dropped record immediately engages with the next record and enters its sound groove near the initial end thereof, the playing proceeding without intermission.

To complete the contact the succeeding record (see the second record in the series of Fig. 4) is provided with a contact 115 near its upper end and projecting slightly from the surface of the record so that it will be touched by a contact finger 116 (Fig. 12) when the stylus reaches the end of the sound groove at the edge of the preceding record. This finger projects from the sound box parallel with and slightly above the stylus and while insulated from the sound box is connected to the conductor 117, the latter (see Fig. 1) passing to the battery or other source of electromotive force 118 and thence to that terminal of the magnet 69 to which the conductor is connected.

The result is that when the stylus reaches the end of the sound groove at the edge of the first record, the contact finger 116 touches the contact 115 and energizes the counter-weight magnet 69 and the brake magnet 31, but not the arm-swinging magnet 78 nor the stylus-changing magnet 91. The outer record which has just been played is then dropped onto the lower support, the stylus passing over the edge of that record onto the face of the next adjacent record. At the same time the counter-weight 68 is shifted and the stylus, commencing its downward travel, engages the initial end of the sound groove of the next record and starts the reproduction of the latter. The next or second record (see the second record of the series in Fig. 4) has a surface contact 119 at the end of the sound groove near the lower end of the record which contact is engaged by the stylus when it reaches the end of the sound groove. This engagement results in the energization, as previously described, of the brake magnet 31, the magnet 78, and stylus changing magnet 91. This causes the changing of the stylus and the dropping of the record on to the lower support. At the same time the magnet 78 swings the reproducer arm and sound box to permit the descent of the record, this at the same time causing the contact 71 to complete the circuit 72 through the counter-weight magnet 70, shifting the counter-weight to institute the upward movement of the reproducer arm. On the deënergization of the magnet 78 the spring 69 immediately draws the arm back to bring the stylus against the next successive record and this operation is repeated until the machine is stopped or until the records have all been played.

From the foregoing it will be seen that records may be played in succession without intermission, making it possible to utilize two or more records to reproduce the different parts of the same long piece or selection, the reproduction proceeding without interruption between the separate records.

In order to provide means for skipping a record from time to time when desired, a switch 120 is provided which is adapted to connect the circuit 121 containing the battery 122 with the conductor 80 and the conductor 81, thereby energizing the magnet 31 without affecting the other controlling devices of the machine. The closure of the switch 120, therefore, will cause the record to be dropped to the lower support and the machine to play the next adjacent record instead.

While I have herein shown and described for purposes of illustration one specific form of machine and as applied to a specific type of record, it is to be understood that the invention is limited neither to the particular form of machine nor to details of constructions shown, or to the specific form of record disclosed.

Claims:

1. In a multiple record phonograph the combination with reproducing means of a rotatable record support for holding a plurality of records in co-axial relation, means for causing engagement therewith of the reproducing means, and means for thereafter automatically effecting the transfer of said records each to another position on the said rotary support.

2. In a multiple record phonograph, the combination with a rotatable record support on which the record is mounted in co-axial relation thereto while being played of means for effecting the shifting of the record from the playing position on said support to another position on the same support.

3. In a multiple record phonograph, the combination with reproducing means of a rotary magazine support on which the records are held in co-axial relation thereto, means for automatically applying the reproducing means to the records in succession and withdrawing the same after the record has been reproduced and means for shifting a record from its position on the support after it has been reproduced, the record remaining on the said support while being reproduced.

4. In a multiple record phonograph, the combination with reproducing means of a support on which the records are held stacked one against another, means for automatically applying the reproducing means to the records in succession and for withdrawing the reproducing means after the record has been reproduced and means for shifting a record from its position on the support after it has been reproduced, the record remaining on the said support while being reproduced.

5. In a multiple record phonograph, the combination with a rotatable record support for holding a plurality of records in coaxial relation, a reproducer, means for moving the reproducer initially into contact with a record to reproduce the same, means for withdrawing the reproducer on the completion of its reproduction, and means to effect the shifting of the record on and relatively to the said support to permit the application of the reproducer to the next adjacent record on the rotatable support.

6. In a multiple record phonograph the combination with a rotatable record support for holding a plurality of records in co-axial relation thereto, a reproducer, means for automatically moving the reproducer initially into contact with a record on said support to reproduce the same, means for automatically withdrawing the reproducer on the completion of its reproduction, and means thereafter to effect the shifting of the record to another position on the rotatable support.

7. A multiple record phonograph having reproducing means, a plurality of nested records arranged one within the other, and means for automatically presenting said records to said reproducing means to be played.

8. A multiple record phonograph having a record support, reproducing means, a plurality of records each consisting of a hollow truncated conical body held in nested relation on said support, and means for presenting said reproducing means to said records in succession.

9. A multiple record phonograph having a rotary record support, reproducing means, a plurality of records each consisting of a hollow truncated conical body held in nested relation on said support, and means for presenting said reproducing means to said records in succession.

10. In a multiple record phonograph the combination with means for holding in stacked relation a plurality of records, of reproducing means and electromagnetic means for controlling the shifting of a record from said stacked group.

11. A multiple record phonograph having reproducing means, a support for a plurality of records coaxially arranged and record selecting and presenting means passing through the records themselves for presenting successive records to the reproducing means.

12. A phonograph having a rotary record support, a traversing reproducer, a reproducer arm a counter-weight on the arm for controlling the traversing movement of the reproducer and means for automatically shifting the counter-weight to reverse the movement of the arm.

13. A multiple record phonograph having a removable record magazine, a motor, and means for rendering the motor inoperative on the removal of the magazine.

14. A multiple phonograph having a rotary record support for holding a plurality of records, means for reproducing said records in succession on said support, a rotary holder for receiving a reproduced record, and means for automatically causing the transfer of records in succession after reproduction from said rotary support to said holder.

15. A multiple record phonograph having a rotary record support for holding a plurality of records, means for reproducing said records in succession on said support, a rotary holder for receiving a reproduced record, and electro-magnetic means for controlling the transfer of records in succession after reproduction from said rotary support to said holder.

16. A multiple record phonograph having a rotary record support, a plurality of records each consisting of a hollow truncated conical body held in nested relation upon said support and means for reproducing said records in succession thereon.

17. A multiple record phonograph having a rotary record support for holding a plurality of records, means for automatically reproducing said records in succession on said support, a rotary holder for receiving a reproduced record, and electro-magnetic means for controlling the transfer of records in succession after reproduction from said rotary support to said holder.

18. A multiple record phonograph having a rotary record support for holding a plurality of records, means for automatically reproducing said records in succession on said support, the latter having also a rotary holder for receiving a reproduced record, and means for automatically causing the shifting of a reproduced record from its position of reproduction on said support to a position where it is received by said rotary holder.

In testimony whereof, I have signed my name to this specification, in the presence of two subscribing witnesses.

GEORGE H. UNDERHILL.

Witnesses:
ROBERT H. KAMMLER,
LAURENCE A. JANNEY.